United States Patent [19]
Grimes

[11] 3,754,301
[45] Aug. 28, 1973

[54] APPARATUS FOR EXTRACTING VISCERA FROM FISH

[75] Inventor: Eldon L. Grimes, Seattle, Wash.

[73] Assignee: Marine Construction & Design Co., Seattle, Wash.

[22] Filed: Aug. 16, 1971

[21] Appl. No.: 172,162

[52] U.S. Cl. ................................................. 17/58
[51] Int. Cl. ........................................... A22c 25/14
[58] Field of Search ............................ 17/58, 59, 60

[56] References Cited
UNITED STATES PATENTS
2,322,831   6/1943   Danielsson .............................. 17/58

*Primary Examiner*—Robert Peshock
*Attorney*—Christensen & Sanborn

[57] ABSTRACT

An arcuate segmental rocker actuated by cam-controlled carriage elements squeezes out the viscera. Rolling action of the rocker is effected by cam controlled programming of depression and elevation of the respective end portions of the rocker sequentially as the fish is advanced on a support table. Completion of extraction is assured by a rotary brush means stationed along the feed path drawing out partially extruded viscera from the body cavity and severing any vestigal connecting membranes.

14 Claims, 4 Drawing Figures

Patented Aug. 28, 1973

Patented Aug. 28, 1973
3,754,301
3 Sheets-Sheet 3
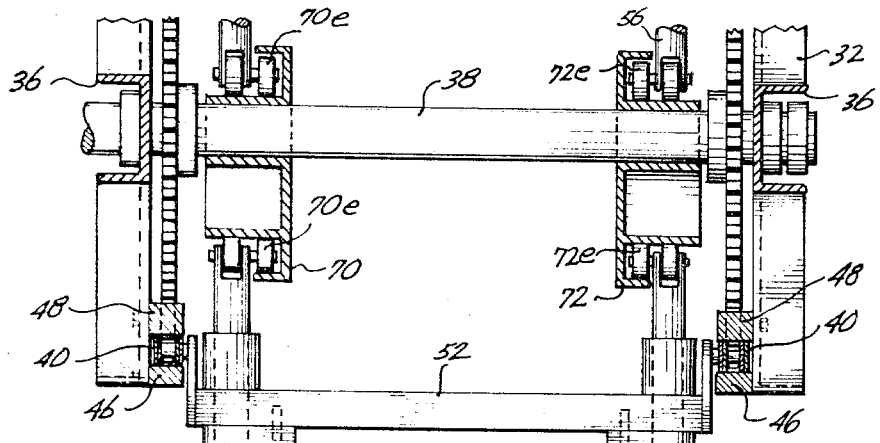
Fig. 3.
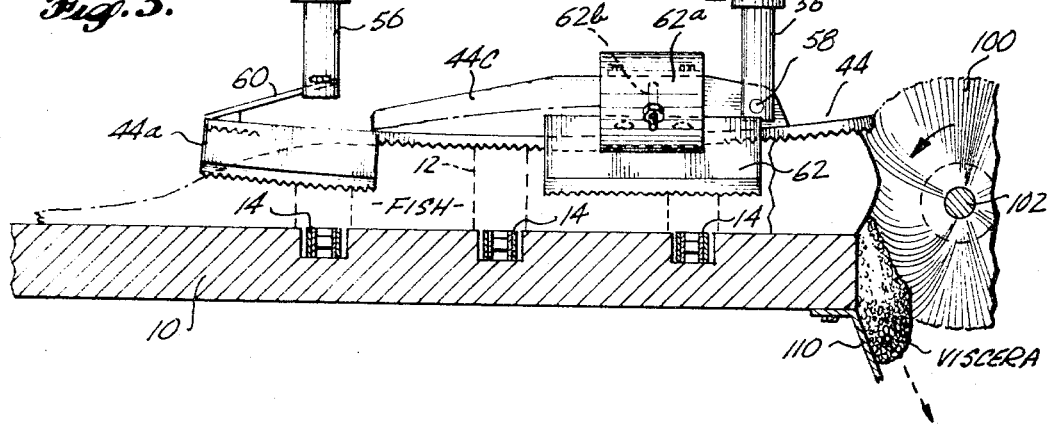
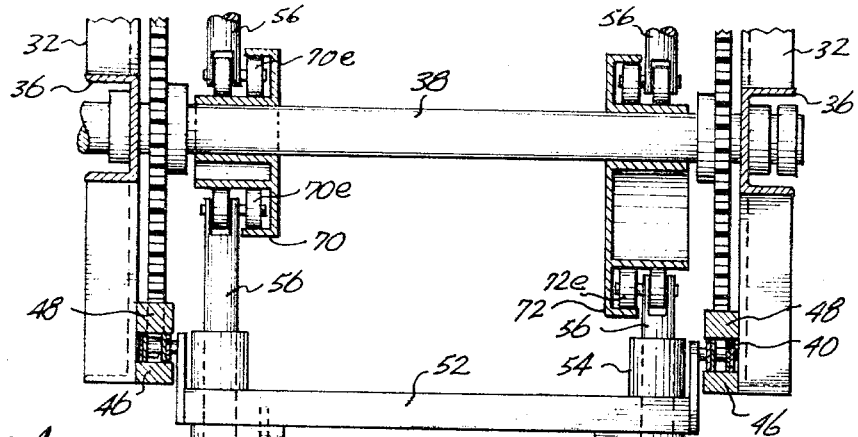
Fig. 4.
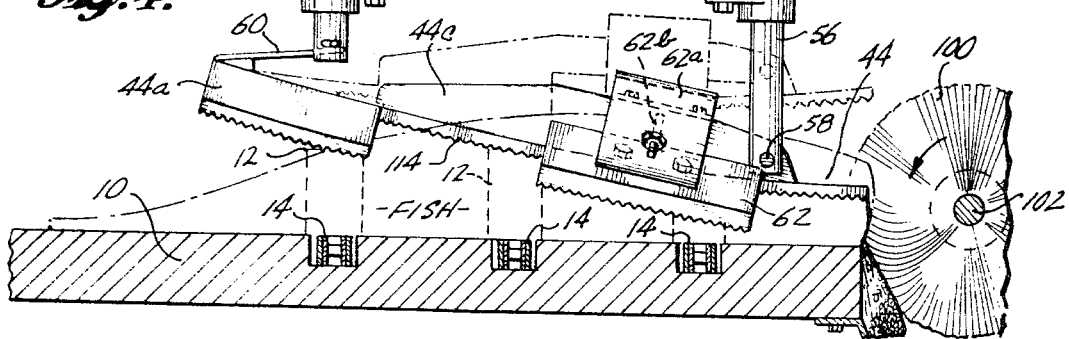

3,754,301

APPARATUS FOR EXTRACTING VISCERA FROM FISH

BACKGROUND

This invention relates to improvements in mechanical fish eviscerators of the type wherein beheaded fish are subjected to progressive squeezing action by means of a roller advanced toward the head end. The invention is herein illustratively described by reference to the presently preferred embodiment thereof; however, it will be recognized that certain modifications and changes with respect to details may be made without departing from the essential features.

The present invention embodies improvements over a prior device wherein fish are supported flatwise on a feed table or conveyor transporting them in a direction from a beheading station to an "iron chink" or other apparatus used in a fish cannery. On the feed table in that application beheaded individual fish are squeezed progressively lengthwise such as with a relatively small-diameter roller, starting near the tail end thereof so as to extrude the viscera out of the open head end of the body cavity. In working with this rolling technique it was discovered that superior results can be achieved if the compressive force is applied by an arcuate rocker surface of a relatively large curvature radius, i.e., so large in fact that if a cylindrical roller of such radius were to be embodied in the machine, the resulting bulk and cost would be prohibitive. Yet with a segmentally formed rocker of large radius of curvature a number of problems associated with mechanical extrusion by applied pressure appear to be solved. It appears that the rocker achieves an internal hydraulic pressure effect in the fish with acceptably low applied pressures aiding the extrusion that a small diameter roller does not achieve regardless of pressure exerted by the roller. Thus any tendency to flesh damage is reduced and the extrusion occurs quickly in terms of rocker dwell time. In the case of salmon, for which the invention is primarily intended, the results are obtained largely without regard to differences in type, size or condition of the fish within wide limits.

Accordingly an object of this invention is to devise an improved mechanical eviscerater of the rolling or rocking type. A more specific purpose is to provide such a device that is compact and operates effectively in a short time interval so that it may be readily incorporated in a cannery line without undue requirement for space and without necessity of retarding the operating rates of related machinery in the line.

Still another object hereof is to devise an improved mechanical eviscerater which is relatively simple and reliable, which avoids appreciable damage to the flesh or ejected roe (a value by-product) and which works effectively with fish of varying sizes, shapes and conditions. Among the conditions which may vary and which the improved eviscerater accommodates within wide limits are state of preservation, degree of maturity of the roe or milt organs, texture of flesh, and general body type and flesh characteristics of the fish.

A further object hereof is to devise an efficient and versatile mechanical viscera extractor incorporating auxilliary brush means associated with the rocker such that partial extrusion of the viscera effected by the rocker is reliably completed and vestigal connecting membranes severed in the process.

A further problem overcome by a mechanical rocker which achieves a rolling effect without shifting or translating along the fish is that of simplifying the task of holding the fish steadily beneath the rocker. A small-diameter roller which advances tends to push the fish ahead of it. It is also an object, therefore, to provide a mechanical eviscerater overcoming the former problem; also one with active parts so formed and arranged that correct positioning of the fish on the feed table is not unduly critical, and with related holder means effective to meet any tendency of the rocker to shift the fish under applied pressures without necessity of perforating or otherwise damaging the flesh.

In accordance with this invention, a downwardly acting arcuate segmental pressor foot or rocker, preferably with a side extension angled down over the dorsal side of a fish to help hold its position, is rocked progressively lengthwise against the fish by cam-actuated carriage elements. The latter hold the rocker against shifting lengthwise or laterally in relation to the fish carrier, and their vertical movement is so programmed as to create a rocking or rolling action. Thus the carriage elements depress first one end portion of the rocker while the other end portion remains elevated, whereupon depressing the second end portion while the first end portion is held depressed, and finally elevating the first end portion with the second end portion held depressed. An additional holder associated with the rocker is pressed against the back side of the fish near the head end thereof through an independent spring arrangement which maintains its applied pressure as the rocker advances.

As a further feature, a rotary brush means is stationed adjacent the path of the advancing head ends of the fish with its rotational axis oriented substantially parallel to the feed path of the fish. Contacting viscera at least partially extruded by the rocker, the brush is rotated in a direction to draw the viscera fully out of the body cavity and simultaneously sever any remaining membranal connections.

These and other features, objects and advantages of the invention will become more fully evident from the following description of the preferred embodiment thereof by reference to the accompanying drawings.

DESCRIPTION OF DRAWINGS

FIG. 1 is a side elevation view of the improved mechanical eviscerater.

FIGS. 3 and 4 are transverse sectional views taken respectively on lines 3—3 and 4—4 of FIG. 1, the latter two views having various parts broken away for convenience in illustration.

DETAILED DESCRIPTION

Figure 2:
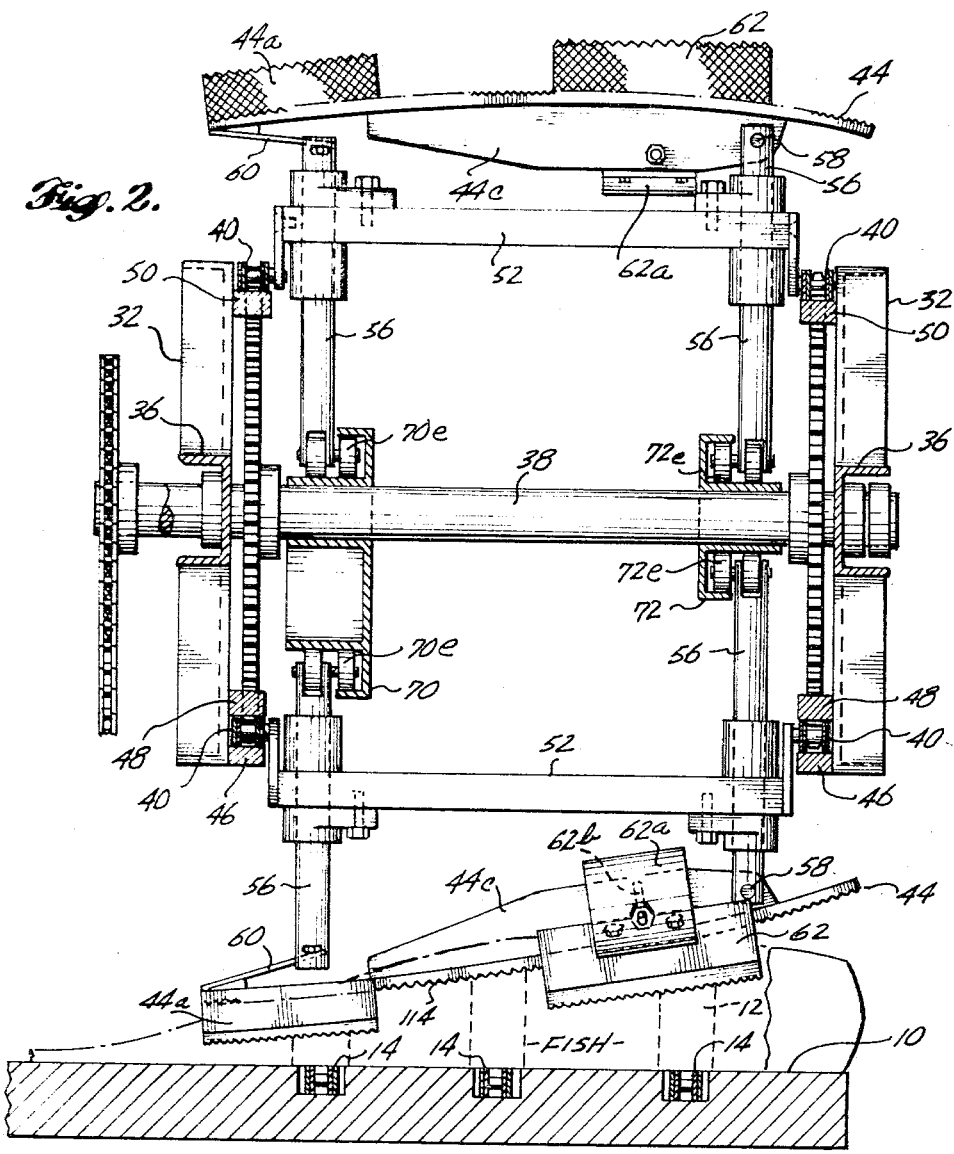
FIG. 2 is a transverse sectional view of the machine taken on line 2—2 in FIG. 1.

In the illustration fish supported flatwise on feed table 10 in a generally horizontal position are successively advanced transversely of their length along a generally horizontal feed path. To effect positive advance of the fish in definite spaced positions on the table, the belly of each fish is contacted by a group of two or more pushers 12 moved abreast by the top stretches of endless feed chains 14 recessed in table slots to or below table surface level. Therefore, the fish are advanced, dorsal edge first, by sliding them in spaced succession in a generally horizontal plane defined by the flat support surface of table 10. As the fish are introduced to the mechanism shown in FIG. 1 they are already beheaded so as to open up the head end of the body cavity preliminary to extrusion of the viscera out of this opening.

Feed table 10 including chain conveyors 14 with pushers 12, or equivalent, may be part of an existing conveyance system or may conprise a separate unit which is to be inserted in a cannery line as shown. In the example the entire eviscerating machine is supported on a pedestal comprising a U-shaped horizontal frame 16 with adjustable feet for leveling, which frame supports a post 18 carrying thereon a support collar 20. The latter in turn is part of a cantilevered frame 22 which directly supports the feed table 10 from post 18. The lower stretches of the endless feed chains 14 pass beneath the structure 22. Suitable means associated with collar 20 permit adjusting its height on post 18 so as to permit leveling the table with adjoining apparatus if desired. Power drive means 26 mounted on the base portion of the post 18 provides drive power both to the table conveyor chains 14 and to the overlying carriage mechanism to be described. Alternatively such drive power may be derived from associated cannery line machinery with which the eviscerater is to synchronize. A mechanical coupling to adjoining machinery (not shown) may be used to assume proper synchronization therewith without loading the other machine's drive source. The drive connection from the unit 26 to the conveyor chains 14 is not shown but may be of any suitable type.

It will be seen that post 18 is offset to one side of the elongated conveyor table 10–14 (in the example of FIG. 1, the far side) and rises to an elevation substantially above the level of the feed table to a head 28 from which a cantilever arm 30 projects generally horizontally and transversely over the feed table 10. The cantilever arm in this case is in the form of a round tubular section. A pair of transversely spaced yokes 32 mounted by clamp bands 34 on cantilever arm 30 hang down over feed table 10 in vertical planes extending lengthwise of the feed table as the principal means of support for the carriage conveyor 34. The latter is thus mounted to overlie and generally coextend with the feed table.

Longitudinal channel members 36 joined to the respective hanger yokes 32 parallel to table 10 support the conveyor shafts 38. Endless conveyor chains 40 encircle sprockets 42. The latter are mounted on the respective shafts 38. The conveyor chains carry and advance the successively spaced presser mechanism units by which the successively advancing fish are eviscerated. Each presser mechanism unit includes a presser foot or rocker 44 moved and mounted so as to work against fish on the underlying feed table 10 as the carriage conveyor 34 is driven synchronously with feed conveyor 10–14. To these ends, carriage conveyor chains 40 extending along the lower stretch of the carriage conveyor 34 are guided and held in a straight line between slide bars 46 and 48 parallel to the horizontal feed path of the fish on table 10. To prevent sagging of the upper or return stretches of endless conveyor chains 40 under weight of the supported presser mechanism units, a slide bar 50 underlies and supports each upper stretch.

Each such presser mechanism unit is physically supported and advanced by a cross bar 52 connected between and moveable with the pair of conveyor chains 40. Near its ends the cross bar has support collars 54 which, in the active lower horizontal stretch of the carriage conveyor 34, are oriented vertically. Carriage posts 56 are slidably received in the support collars 54 and at their lower ends are supportively connected to the associated presser foot or rocker 44. The rocker end portion associated with the head end of the beheaded fish is pivotally connected directly at 58 to one post 56 and the tailward end of the rocker is connected to its post 56, preferably through a leaf spring 60 which yields as necessary to accommodate some range of variations in fish thickness and to assist in achieving an even rolling or rocking motion and related extrusion pressure on the fish created by the cam action. The vertically reciprocable posts 56 thus carrying the presser foot 44 permit its end portions to be elevated and depressed independently while the presser foot is held against appreciable movement longitudinally of itself or laterally in relation to the underlying fish pushers 12. Thus the presser foot in this case, though it rolls on the fish, is actually also a holding aid rather than a means to produce longitudinal shifting of the fish ahead of its region of maximum pressure.

Before describing the means for actuating the rockers or presser feet to execute a combined holding effect and progressive rolling movement against the fish, the characteristics of the rockers will be described. As depicted each such rocker or presser foot is preferably of plate-like arcuate segmental form, shaped like a segment of wheel rim or rocking chair rocker. It may approximate the arc of a circle, but this is not essential as elliptical or other smooth convex-downward curves will also serve. Assuming a circular arc the diameter of the circle which it represents will typically be several times the length of fish being eviscerated, such that the arcuate length of the presser foot is then of the order of 10° to 20° of the total circle. This rate of curvature is not great, the middle portion typically bowing downwardly only two or three inches below the ends. Some convexity is essential, however, in order to achieve the desired progressive rolling effect.

The presser foot length corresponds approximately to the length of the body cavity of the largest fish to be eviscerated which is the case roughly depicted in the illustrations. Adjacent the tailward end of the presser foot 44 is a lateral wing or extension 44a forming a downwardly open obtuse angle with the generally horizontal transverse (width) extent of the presser foot and designed to hug or contact the dorsal side of the fish adjacent its tail portion. This extension 44a thereby serves to prevent the tail portion of the fish from being deflected laterally out from beneath the presser foot during the initial phase of rolling should there be a net lateral force component at that stage not adequately resisted by traction of the presser foot proper. The pushers 12 hold the fish against deflection laterally in the opposite direction. As previously indicated, the tendency of fish to shift longitudinally, and to some extent laterally, is already minimized by the presser foot itself since, though it rocks on the fish, it does not create an unduly prominent "wave" of flesh ahead of it tending to advance the fish. Moreover it contacts a relatively large surface area on the fish during operation. Thus by surfacing of the lower side of the presser foot with a knurled or checker rubber mat providing tractional contact with the slippery fish, the presser foot itself serves as its own holding device. The nubs or buttons on the mat need not perforate the skin of the fish but only tend to indent the surface sufficiently to hold the fish against sliding. Thus there is no damage to the flesh.

As shown in FIG. 1 the width of the presser foot 44 preferably represents a small fraction of the depth of a fish, that is the distance thereof between the dorsal and belly edges, and in fact typically this width is even less than the depth of the belly cavity. As a result downward pressure of the rocker-shaped presser foot concentrates the force of compression into the area where it is effective to extrude the viscera, namely in that overlying the belly cavity. Some lateral slope (i.e., about 12°) is given the tailward end of the rocker opposite that of extension 44a to assure proper initial positioning of the fish, so that as the rocking progresses the belly cavity region of the fish receives the pressure. To and beyond its mid-region the pressure face returns to horizontal.

Additional holding action on the fish under pressure from the rocker 44 is achieved in later stages of rocking action by a hold-down member 62 which is also offset from and angled to the presser foot 44, as shown best in FIG. 1. An arcuately shaped leaf spring 62a extends laterally from the top of the rocker to overlie and support the clamp element 62. Details of the mounting of the spring 62a may vary but in the example the spring is anchored to a longitudinal stiffener rib 44c on the upper side of the bent plate-like presser foot at a location generally between the support posts 56. A tie rod 62b extending horizontally from the base end of the spring 62a passes through a slot in the spring 62c and has an enlargement or knob on its projecting end to serve as a stop limiting or controlling deflection of the spring 62a and thereby the spread distance between the presser foot 44 and holder pad 62. The arrangement is such that as the headward end of the presser foot 44 is being depressed the pad 62 soon moves to bear against the dorsal top side of the fish, and as the presser foot continues to descend the spring 62a is progressively deflected so as to increase the hold-down pressure exerted by the pad 62. Later, as the opposite end of the foot is elevated the spring pressure relaxes some. In any case the spring deflects to accommodate the relative movement which ensues between the holder 62 and the presser foot as different phases of the rocking occur while keeping the pad snugly against the fish. A nubby mat on the underside of the holder 62 improves traction of the holder against the fish as in the case of the rocker 44 and extension 44a.

In order to program the depression and elevation of the respective end portions of each presser foot as a function of its advancing position lengthwise of the feed path, two cams 70 and 72 mounted for convenience on shafts 38 extend lengthwise of the carriage conveyor 34 and are engaged by sets of followers 70e and 72e, respectively. These cams in cross section are channel-shaped in the sense that at least one of the follower rollers of each set runs between parallel cam surfaces of a cam so as to effect both elevation and depression movements of the support posts 56 in positive manner. Alternatively return springs may be used to move the posts 56 up or down using the cam as a guide or limiting element, but this is less satisfactory than the positive action of dual cam surfaces as described.

Each of the cams 70 and 72 extend generally the length of the lower, active stretches of carriage conveyor chains 40 but are included in a total guide track circuit for the followers extending around the shafts 38 paralleling the conveyor chains. This circuiting of the followers assures entraining engagement of the followers with the cams as the presser mechanism units enter the active stretch over the feed table 10.

As shown in FIG. 1, cam 70 is associated with the posts 56 which carry the tailward ends of the presser feet 44 whereas cam 72 is associated with the posts 56 carrying the opposite ends of the respective presser feet. In FIG. 1 wherein the fish are introduced at the right end of the figure and move leftward, cam 70's active stretch includes first a segment 70a which slopes rather steeply downward toward the table 10 to a generally horizontal segment 70b paralleling the table. The latter, at a longitudinal point approximately midway between the ends of the carriage conveyor 34, leads into a gently upwardly sloped segment 70c. As a result, the tailward end of the presser foot is depressed rather quickly against the tail portion of the fish, is thereafter held at this elevation for approximately half the length of the feed table, and thereupon is gradually elevated.

The other cam, 70, cooperating with cam 72, has a long and gently downwardly sloped initial portion 70a which extends from the initial end of the feed path beneath conveyor 34 to a point displaced therefrom approximately three-quarters the length of the feed table, at which it leads into a horizontal portion 72b short in length followed by an upwardly sloping portion 72c of rather steep slope. The slopes, though opposite, of cam portions 72a and 72c are approximately equal as are the slopes of the cam portions 70c and 72a.

It will thus be seen that the cooperative positions, lengths and slopes of the related sections of cams 70 and 72 are such as to produce a progressive rocking or rolling action on the fish and that due to the downward convexity of the rocker the pressure-exerting depression of the surface areas of the rocker along its length is inherently somewhat greater midway between its ends than it is at the ends. This is as it should be in the sense that the extrusional force needed to impel the viscera out of the body cavity should be developed gradually but should proceed to a maximum by the time the rocker reaches approximately the midpoint along the fish. Thereafter the extrusional force is continued until the viscera is expelled. Under most conditions of commercial grade fish (salmon) the viscera will be wholly expelled or left hanging only by a connecting membrane. In some cases and with some fish, however, due to the extremely wide variation that can occur in the condition and characteristics of different fish being run through a cannery, the viscera will be only partially extruded.

It is for this latter reason that a completion brush of rotary form, 100, is mounted adjacent the table 10 on the side thereof along which the head ends of the fish are advanced. The rotary brush is mounted on a shaft 102 carried by a bracket 104 and driven in rotation, preferably from the mechanism which drives carriage conveyor 34. In the example a jack shaft gear driven from one conveyor shaft 38 drives the brush. The brush is positioned at or slightly above the level of the edge of table 10 and preferably extends slightly over this table such that its flexible though somewhat stiff bristles bear on the partially ejected viscera and thus draw and slide them the remaining distance out of the body cavities of the fish. During operation of the machine the brush rotates continuously and is effective to wipe viscera, including any hanging membranes, which it severs, down into the awaiting hopper or guide chute 110 for disposal. The brush bristles preferably have the stiffness and degree of flexibility of a relatively stiff fiber brush used for cleaning fish or work bench surfaces. They may be of natural fibers or synthetic, such as nylon or the like. The brush diameter is not critical nor is its length, but, of course, it should be long enough (parallel to the feed path of the fish) in order to complete the withdrawal and severance of viscera in the interval while a fish is advancing past the brush in moving to the end of table 10.

It will, of course, be recognized that elevational adjustments of the carriage conveyor 34 as a whole or of cams 70 and 72 is usually provided so as to optimally relate to general fish size the spacings between top surface of table 10 and the presser feet in their successive phases of action. In a given run of fish, however, there is usually not any major change of size so that the setting may remain unchanged during their processing.

These and other details of design and operation of the device, including variations therein which may readily be envisaged by those skilled in the art of fish processing equipment, will be evident.

I claim:

1. Apparatus for extraction of viscera from beheaded fish by mechanically applied pressure wherein the fish supported flatwise in a generally horizontal plane are squeezed by a rolling action progressing toward the head end thereof, said apparatus comprising means including and positioning a presser foot of downwardly convex arcuate segmental form to rock lengthwise along the length of the fish, carriage elements supportively connected to the presser foot by respectively opposite end portions thereof and arranged to superimpose the presser foot lengthwise on the fish and to raise and lower the respective end portions independently while holding the presser foot against movement lengthwise, and control means arranged and operable for actuating the respective carriage elements so as to depress first one end portion of the presser foot against the fish with the other end portion relatively elevated, thereafter progressively to depress the second end portion relatively while holding the first end portion depressed and finally to progressively elevate the first end portion relatively while holding the second end portion depressed, thereby to rock the presser foot progressively in a viscera-extruding motion along the fish.

2. The apparatus defined in claim 1 wherein elevation of the first end portion is effected more rapidly than depression of the second end portion.

3. The apparatus defined in claim 1 wherein elevation of the first end portion is effected more rapidly than depression of the second end portion and is initiated substantially upon completion of depression of the first end portion.

4. The apparatus defined in claim 1, further including means supporting the fish and moving the same transversely of the length thereof in a generally horizontal feed path, a carriage conveyer movable in a path overlying and extending generally parallel to said horizontal path, the vertically movable carriage elements being connected to said carriage conveyer for movement horizontally therewith, and wherein the control means comprise members positionally related to the carriage conveyer so as to actuate the carriage elements as a function of position of the fish advancing along said path.

5. The apparatus defined in claim 4, wherein the members of the control means comprise elongated guide cams extending parallel to said path and followers engaging such cams and respectively connected to the carriage elements so as to effect said depression and elevation of the carriage elements as a function of position thereof along said path.

6. The apparatus defined in claim 5, wherein the carriage conveyer comprises spaced parallel endless chains having lower stretches guided in paths substantially parallel to said feed path and a support member interconnecting said chains for movement therewith, said support member supporting said carriage elements and guiding the same for vertical movement in relation thereto at relative positions spaced apart transversely to the length of said path, and wherein the respective cams comprise means engaged by the associated followers to effect depression of the respective carriage elements positively and elevation of the respective carriage elements positively.

7. The apparatus defined in claim 6 wherein at least one of the carriage elements includes a spring arranged to transmit force of the carriage element effecting depression of the associated end portion of the presser foot against the fish.

8. The apparatus defined in claim 1 wherein at least one of the carriage elements includes a spring arranged to transmit force of the carriage element effecting depression of the associated end portion of the presser foot against the fish.

9. The apparatus defined in claim 1, further including a positioning holder adjoining and extending generally parallel to the presser foot, said holder being positionally related to the foot so as to engage the back of a fish being compressed by the presser foot.

10. The apparatus defined in claim 9 wherein the holder comprises a generally plate-like member dihedrally related to the presser foot so as to exert pressure on the fish both downwardly and laterally toward the pressor foot, so as to hold the fish against sliding laterally from beneath the presser foot during viscera extrusion.

11. The apparatus defined in claim 1, further including means to complete extraction of viscera extruded from the fish comprising a rotary brush mounted adjacent the beheaded end of the fish for rotation on an axis generally transverse to the fish so as to engage the extruded viscera, and means to rotate the brush in a direction to pull the viscera from the fish.

12. The apparatus defined in claim 11, further including table means supporting and conveying the fish in a horizontal feed path transversely of the length thereof, accompanying operation of the control means, and wherein the rotary brush is mounted adjacent the feed path in such relative position to engage the viscera extruded by the presser foot.

13. In apparatus for extracting viscera from beheaded fish including, in combination, means to initiate such extraction and apparatus for completing such extraction and severance of the membranal connection of the viscera comprising a rotary bristle brush, means positioning the brush to bear against the partially extracted viscera and the beheaded end of the fish and means for rotating the brush on an axis and in a direction to draw the viscera endwise from the fish and press it downwardly therefrom.

14. The apparatus defined in claim 13, wherein the means to initiate such extraction comprises a rocker member and associated means to support a fish on one side while pressing the rocker member against the opposite side thereof in a rocking motion which progresses toward the head end thereof.

* * * * *